United States Patent [19]

Ferrier

[11] Patent Number: 5,767,489
[45] Date of Patent: Jun. 16, 1998

[54] ENHANCED RESOLUTION LIQUID CRYSTAL MICROTHERMOGRAPHY METHOD AND APPARATUS

[75] Inventor: Mark S. Ferrier, Corvallis, Oreg.

[73] Assignee: Hewlett-Packard Company, Palo Alto, Calif.

[21] Appl. No.: 728,928

[22] Filed: Oct. 11, 1996

Related U.S. Application Data

[63] Continuation of Ser. No. 356,594, Dec. 14, 1994, abandoned.

[51] Int. Cl.$^6$ ............................................. H05B 1/02
[52] U.S. Cl. ........................ 219/497; 219/492; 219/494; 219/209; 359/44; 359/86
[58] Field of Search ........................ 219/494, 497, 219/501, 505, 506, 508, 502, 209, 210, 492; 359/36, 44, 86

[56] References Cited

U.S. PATENT DOCUMENTS

| | | | |
|---|---|---|---|
| 4,570,054 | 2/1986 | Chidzey et al. | 219/490 |
| 4,585,925 | 4/1986 | Andre | 219/497 |
| 4,682,857 | 7/1987 | Tan | 350/331 |
| 4,987,289 | 1/1991 | Bishop et al. | 219/209 |
| 5,066,616 | 11/1991 | Gordon | 437/229 |
| 5,088,806 | 2/1992 | McCartney et al. | 359/84 |
| 5,504,306 | 4/1996 | Russell et al. | 219/497 |

OTHER PUBLICATIONS

IEEE, "Improved Sensitivity For Hot Spot Detection Using Liquid Crystals", 1984, David Burgess & Peng Tan, pp. 119–121.
Gidi Fleuren, "Liquid Crystal Microthermography State Of The Art", Dec. 1986.
C E Stephens et al., "A Surface Temperature Limit Detector Using Nematic Liquid Crystals With An Application To Microciruits", 1974, pp. 641–643, Journal of Physics E: Scientific Instruments 19974 vol. 7.
Temptronic Corporation, "Application Note 1–Thermosocket System–Thermochuck System", 1988.
Gordon and Breach Science Publishers, "Physical Properties of Liquid Crystalline Materials", 1980, pp. 13–23.
Frederic J. Kahn et al., "Surface–Produced Alignment of Liquid Crystals", Jul. 1973, pp. 823–828.
Varagur S. V. Rajan et al., "Thermal Transport Phenomena In Nematic Liquid Crystals: A Review", 1973, pp. 55–68.
Marlow Industries, Inc., "Marlow Industries Incorporated Brochure", 1992, pp. 1–12.
World Scientific, "Liquid Crystals–Applications & Uses", vol. 3, 1992, p. 30.
R. W. Dyson with Chapman & Hall, "Specialty Polymers", 1987, p. 81.
R. R. Bowker with IARC Monographs, vol. 19, Vinyl Acetate And Polymers, 1979, pp. 351–359.
"Hot Spot Detection System Using Liquid Crystals With Precise Temperature Controller", Nobuki Hirayama, Kiyoshi Nikawa, Masaru Nakagiri, NEC Corporation, Kawasaki Kanagawa, Japan, pp. 139–144.

*Primary Examiner*—Mark H. Paschall
*Attorney, Agent, or Firm*—Raymond A. Jenski

[57] ABSTRACT

Resolution of liquid crystal microthermographic measurements are improved by depositing a layer of organic pretreatment on the surface of a semiconductor device. A layer of thermographically sensitive liquid crystal material is then deposited on the organic pretreatment layer so that a controlled liquid crystal material layer thickness and an orientation of a majority of crystal molecules of the liquid crystal material parallel to the surface is achieved. The nominal temperature of the surface to be measured is controlled by sensing the nominal temperature near the surface, converting the sensed temperature to a current temperature sense signal, comparing the current temperature sense signal to a target temperature value, and activating a heater in thermal communication with the surface when the current temperature sense signal varies from the reference signal magnitude. A state of essential thermal equilibrium is maintained at and near the surface by thermally insulating the surface and a volume adjacent the surface.

10 Claims, 9 Drawing Sheets

ENHANCED RESOLUTION LIQUID CRYSTAL MICROTHERMOGRAPHY METHOD AND APPARATUS

CROSS REFERENCE TO RELATED APPLICATION

This is a continuation of application Ser. No. 08/356,594 filed on Dec. 14, 1994, now abandoned.

BACKGROUND OF THE INVENTION

The present invention is generally related to a method and apparatus for accurately measuring the temperature of a surface and more particularly for the detection of hot spots on the surface of a semiconductor device due to fault-generated heat dissipation.

It is known that certain long-chain organic materials exhibit an intermediate phase between solid and liquid. This intermediate phase generally is considered to be an "ordered" liquid phase in which the long-chain molecules seek the lowest energy configuration, which is one of alignment. Usually, this alignment places the long chain molecules parallel to each other and, sometimes, parallel to the surface on which the liquid is placed. This alignment enables the ordered liquid to be a good polarizer of light.

Because of the characteristics of the intermediate phase, the material is known as a liquid crystal. When the liquid crystal material is in the true liquid phase, it is optically isotropic (that is, it has identical properties of transmission in all directions of the light transmission). When the liquid crystal is in a solid state it is generally optically anisotropic (exhibiting different properties in the velocity of light depending upon the axis of transmission). It is in the transition state between solid and isotropic liquid state (the ordered liquid, called the nematic state) that liquid crystals exhibit the anisotropic optical properties of the solid and the fluidity and surface tension properties of the liquid. The phase transition temperature from the nematic state phase to the isotropic state is called the clearing point.

In use, a polarized light is directed to the liquid crystal layer deposited on the surface to be analyzed. Light reflected from the surface is passed through a second polarizing filter, called the analyzer, before being viewed or detected. Upon initial set-up, and referencing a region uncoated by liquid crystal, the analyzer is oriented for minimum transmission of the light reflecting from the surface to be analyzed. This minimum occurs when the directions of polarization of the two filters are perpendicular in the optical axis. During analysis, as the temperature of the surface reaches the crystalline-nematic phase transition temperature, domains of long chain molecules orient themselves parallel to each other thereby creating anisotropic conditions. The direction of alignment is called the director. The component of the incident polarized light parallel to the director is transmitted by the liquid crystal domain. In turn, the component of this new light orientation parallel to the analyzer's direction of polarization is transmitted through the polarizing filter (which was previously adjusted for minimum transmission of the polarized light reflected from the non-nematic or solid phase deposition). The final image appears as color domains across the surface.

When the liquid crystal has exceeded the nematic-isotropic phase transition temperature locally as a result of a hot spot in the integrated circuit, the intermediate polarization effect is lost in that region of the liquid crystal. Incident light reflected back through the liquid crystal retains its original polarization due to the isotropic optical properties of the liquid crystal at supernematic temperatures. This polarization means that the analyzer will extinguish that light, resulting in a black spot in the region of the hot spot.

Liquid crystal materials have been used with particular benefit by designers and failure analysts of integrated circuits and other semiconductor devices. The liquid crystal material is applied to the surface of the semiconductor device and forms a nondestructive layer on the surface of the semiconductor which can be used to detect areas of high thermal dissipation by the semiconductor. These areas of high thermal dissipation can indicate areas on the semiconductor device which have failed or otherwise generate abnormal amounts of heat energy. Analysis of the heat characteristics of a semiconductor device have been discussed by Fleuren, "Liquid Crystal Microthermography State Of The Art", Semiconductor Thermal and Temperature Measurement Symposium, Southwest Seminars, December 1986 and by Burgess et al., "Improved Sensitivity For Hotspot Detection Using Liquid Crystals", IEEE-1984 proceedings of the 22nd Annual International Reliability Physics Symposium, pp. 119–121. Each of these papers describe the use of liquid crystal materials for failure analysis and product design of semiconductor devices. The semiconductor device package is opened so that the semiconductor die is visibly exposed but, typically, the bond wires and external connections are retained so that the semiconductor device can be made active and have signals applied while the device is tested for thermal abnormalities. After application of the liquid crystal material, the temperature of the semiconductor device under test is allowed to approach the clearing point and thermal hotspots as described above are observed as black domains among the multicolored domains of liquid crystal material as the temperature of the liquid crystal material approaches the clearing point. The liquid crystal material is most sensitive to small changes or differentials in temperature as the clearing point temperature is approached from the nematic phase of the liquid crystal material. Once the clearing point has been crossed, the liquid crystal no longer provides a repolarizing of the incident light due to the liquid crystal phase anisotropy. The liquid crystal material must be cooled to a temperature below the clearing point temperature in order to again be useful as a thermal detector.

Some suppliers of liquid crystal microthermographic devices have produced equipment which maintains the temperature of the liquid crystal material deposited upon a semiconductor at a temperature below the clearing temperature. This temperature maintenance provides extended periods of measurement and observation time (See Temptronic Corporation, Application Note 1, 1988). Such commercially available equipment is advertised to maintain the temperature of the liquid crystal material to within 0.1 degrees Celsius of the liquid crystal clearing temperature.

However, accurate failure analysis for semiconductor devices having low power dissipation requires even greater thermal sensitivity, resolution, and uniformity than that achieved by previous techniques. In addition, uniformity of thermal sensitivity across the entire surface of a semiconductor die yields easier and more rapid analysis of failure modes or potential failure modes which could be present at any point on the semiconductor die.

SUMMARY OF THE INVENTION

The present invention encompasses a method of and apparatus for measuring the temperature of a surface by employing a liquid crystal microthermographic detector layer in which a layer of organic pretreatment is deposited on the surface. A layer of thermographically sensitive liquid crystal material is then deposited on the organic pretreatment layer so that a controlled liquid crystal material layer thickness is achieved. The nominal temperature of the surface to be measured is controlled by sensing the nominal temperature near the surface, converting the sensed temperature to a current temperature sense signal, comparing the current temperature sense signal to a target temperature value, and activating a heater in thermal communication with the surface when the current temperature sense signal varies from the target temperature value. The surface and a volume adjacent the surface is thermally insulated.

DETAILED DESCRIPTION OF THE PREFERRED EMBODIMENTS

Figure 1:
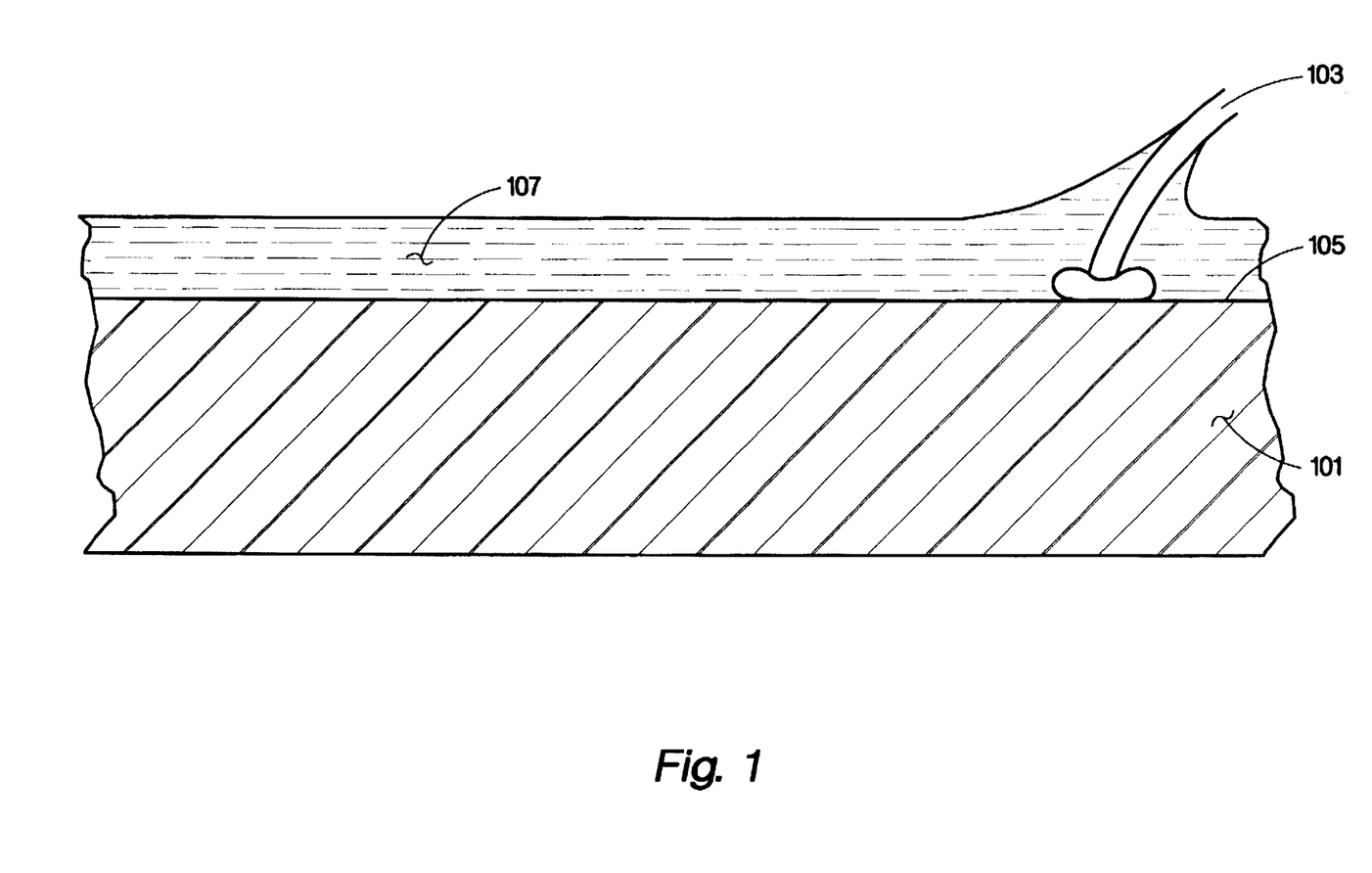
FIG. 1 is a magnified cross sectional representation of a semiconductor device upon which a liquid crystal material has been deposited.

Enhanced spatial resolution, defect sensitivity, and detection uniformity of liquid crystal microthermography is encompassed in the following description of the preferred embodiments. A greatly magnified semiconductor device is shown in cross section in FIG. 1. The semiconductor substrate and all of the deposited layers and active elements are depicted as layer 101. Connections to package leads and other elements located off of the semiconductor device are represented by the bondwire 103 attached to the surface 105 of the semiconductor substrate 101. For analysis purpose, a layer of liquid crystal material 107 can be applied to the semiconductor surface 105 in order to detect thermal hotspots produced by the semiconductor 101. Conventional application techniques of this liquid crystal material 107 usually results in variations of liquid crystal material thickness across the surface of the semiconductor device. Furthermore, a thick layer or uncontrolled layer of liquid crystal material 107 results in a buildup and wicking of the liquid crystal material around the bondwire 103, thereby reducing the effectiveness and sensitivity of the thermal detection in areas around the bondwire 103.

Figure 2:
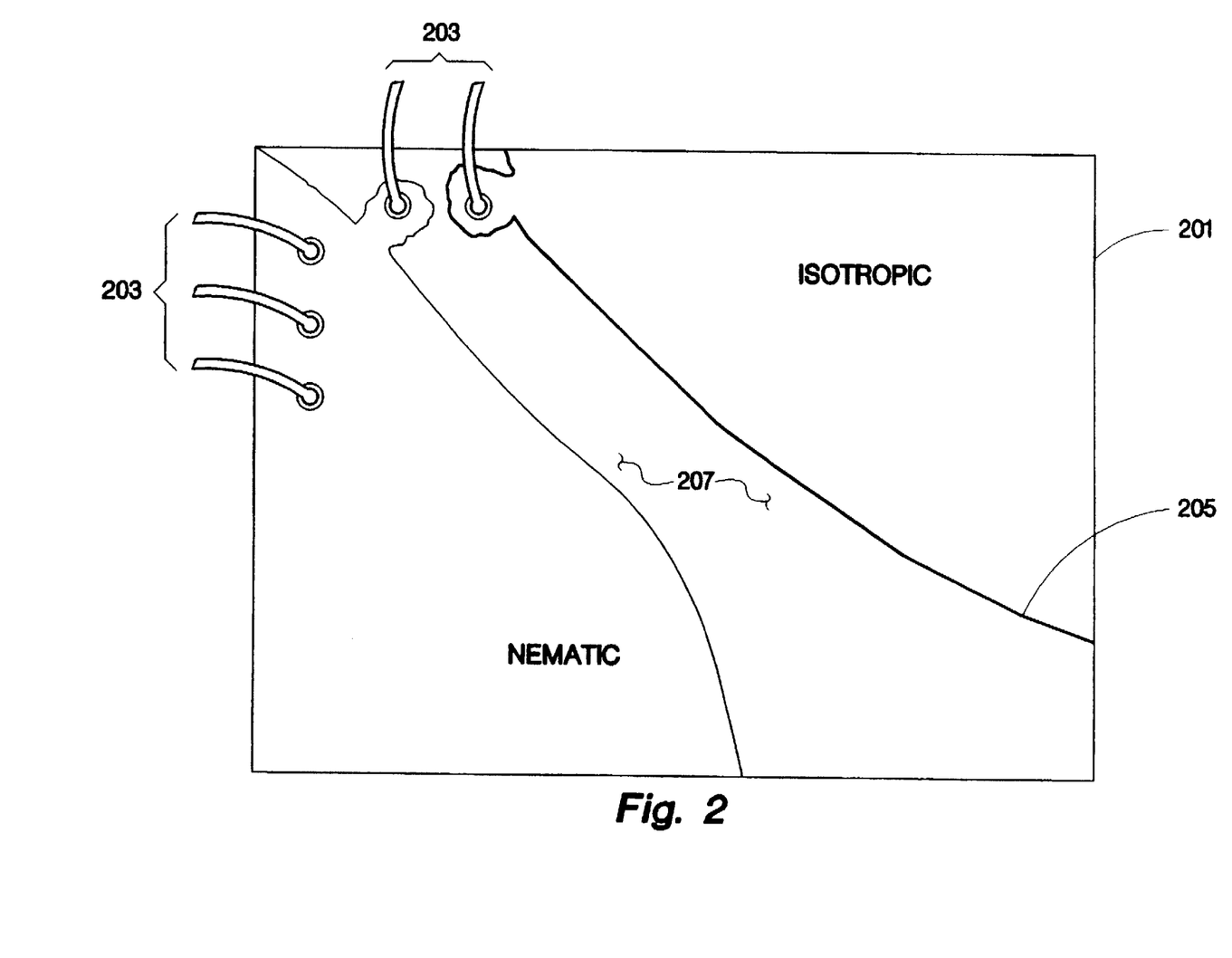
FIG. 2 is a representation of a semiconductor die upon which a liquid crystal material has been deposited but which exhibits a non-uniformity of thermal sensitivity.

A top view of an entire semiconductor die 201 is depicted in FIG. 2. A plurality of bondwires 203 are shown connecting to contacts on the surface of this semiconductor die 201. When the liquid crystal material is conventionally applied to the surface of the semiconductor substrate 201 and brought to a temperature close to the clearing temperature, a pattern similar to that of FIG. 2 is produced when the liquid crystal material is not uniformly applied or has a non-uniform sensitivity. When the surface of the semiconductor is viewed through a polarizing filter and illuminated by polarized light, a line 205 becomes visible between the nematic and isotropic phases and effectively defines a line equivalent to the local clearing temperature. An area of the semiconductor die 201 which is on the nematic side of the clearing temperature line 205 has a large amount of repolarization due to the anisotropic characteristics of the ordered liquid phase of the liquid crystal material. This area is visible as a bright multicolored area which is in stark contrast to the dark isotropic area of the true liquid (which has a temperature above the clearing temperature). The line 205 between the nematic phase liquid crystal material and the isotropic liquid crystal material defines the local clearing temperature and may be caused by variations in the semiconductor die surface temperature, a non-uniformity of the liquid crystal film thickness or sensitivity, or a combination of both. The thermal sensitivity of the liquid crystal film is at its highest near the clearing temperature line 205. As one scans further from the line 205 away from the isotropic region on the semiconductor die 201, the non-uniformity of the liquid crystal material or the decreasing temperature of the die cause the sensitivity of the liquid crystal film for detection of power dissipation due to defects to become less. Accordingly, defect power dissipation may not result in a dark liquid crystal region at that defect. The area of optimum and most uniform thermal sensitivity is depicted as area 207 in FIG. 2. On the other side of the line 205, in the isotropic region, there is no defect detection at all. The use of the present invention provides a large area of sensitive liquid crystal film material across virtually the entire semiconductor die by keeping the liquid crystal both very near and yet also below the transition temperature. Furthermore, the sensitive area 207 around the bondwires 203 which would otherwise be degraded by the wicked liquid crystal film deposited in those areas is improved with the use of the present invention. Failures which occur within the neighborhood of bondwire attachment to the semiconductor die are now detected since the amount of thicker, less sensitive liquid crystal material has been reduced with the use of present invention.

Figure 3:
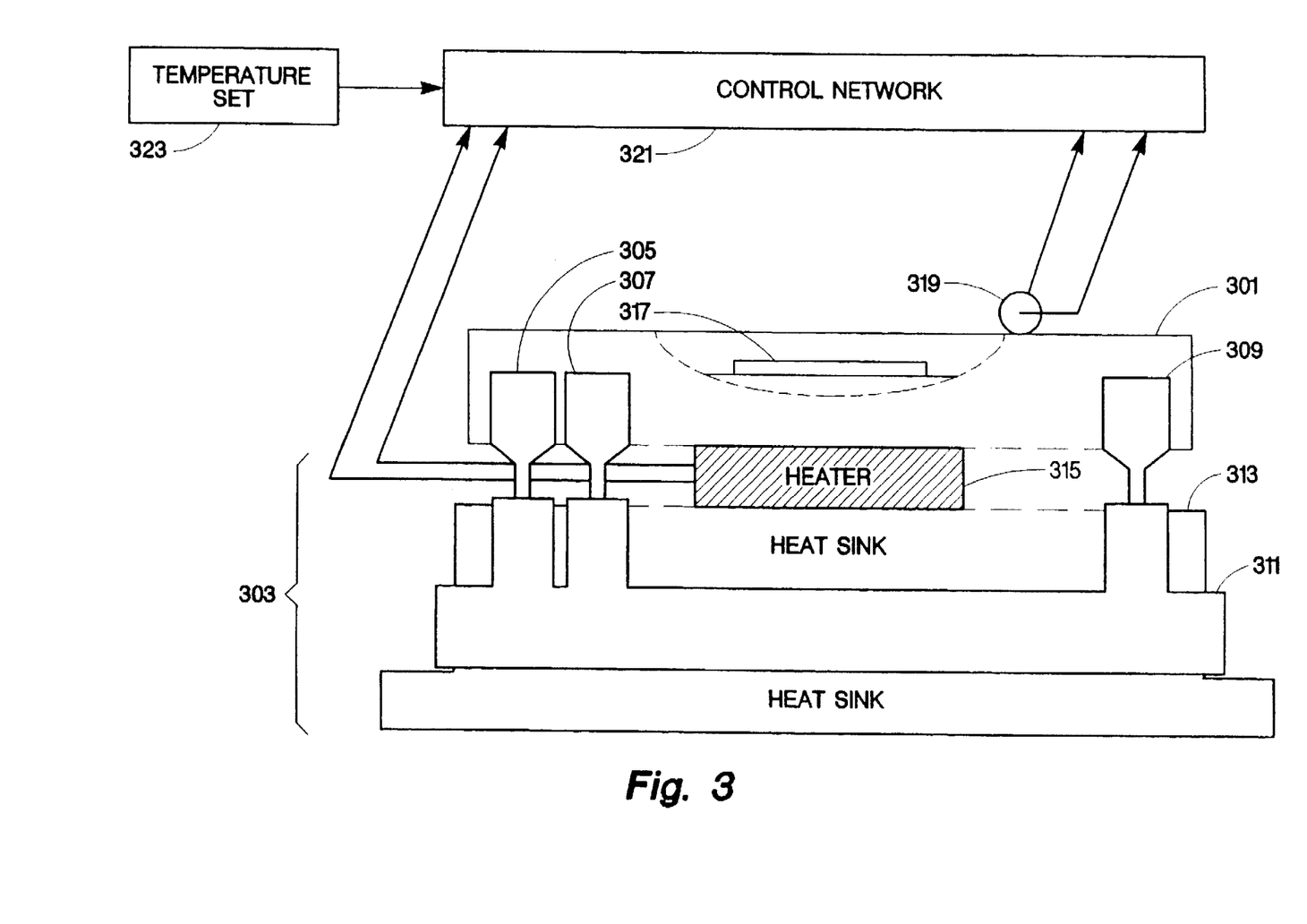
FIG. 3 is a diagram of a thermal test fixture which may employ the present invention.

One use of the liquid crystal microthermography method and apparatus of the present invention is for failure analysis of integrated circuits. In a preferred embodiment of the invention as shown in FIG. 3, a packaged integrated circuit 301 is placed in an integrated circuit fixture 303 in order that power and signal imputs can be applied to the integrated circuit 301 for testing purposes. Power and signal may be applied in a conventional manner through the leads 305, 307 and 309 in conventional fashion. The mating sockets for the leads of the integrated circuits 301 are found in a socket connector 311 which in the preferred embodiment is a conventional DIP socket. Further, the construction of the fixture 303 of the preferred embodiment includes a heat sink 313 and a heater element 315. The heater 315 and heat sink 313 are so arranged that the temperature of the integrated circuit die 317 found within integrated circuit 301 may be adjusted and controlled within a selected temperature range. Also, a temperature sensing element 319 is placed in thermal contact with the integrated circuit 301 very near the die surface (approximately 5 mm in the preferred embodiment).

If further control of temperature is desired, the thermal sensing element 319 may be placed in thermal contact with the integrated circuit die 317 or additional thermal sensing elements may be located at selected points about the integrated circuit. In the preferred embodiment, the thermal sensing element 319 is a diode such as an Alpha DME6569. The characteristics of the diode are linear variation of forward voltage with temperature at constant current. The heater element 315 in the preferred embodiment is a thermal electric heater employing the Peltier effect, which cools one surface of a p-n junction while warming the opposite surface of the junction depending upon the magnitude of the electric current flowing through the junction. In the preferred embodiment the heater element 315 is an SP1547T available from Marlow Industries, Inc., Dallas, Tex. The heater element 315 is supplied an electric current from a control network 321 in order to raise the temperature of the surface of the heater element which is in contact with the integrated circuit 301 while cooling the surface of the heater element 315 which is in contact with the heat sink 313. The amount of current supplied to the heater element 315 is determined by the temperature sensor 319, in a feedback network coupled to the control network 321. The desired die temperature is established by an operator-adjusted temperature set 323.

Figure 4:
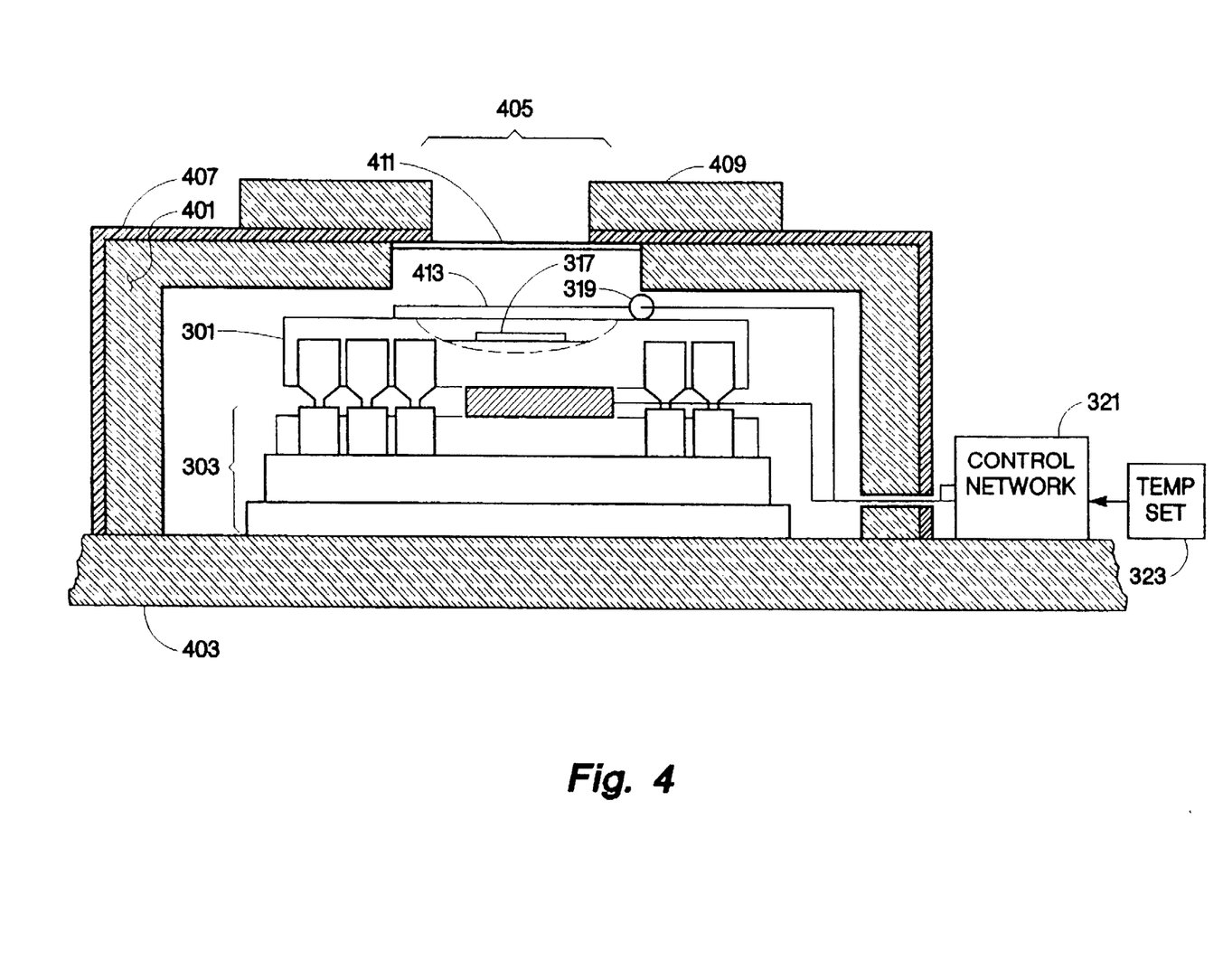
FIG. 4 is a thermally isolated thermal test fixture which may employ the present invention.

FIG. 4 shows the integrated circuit test fixture 303 included in a thermally isolated environment so that temperature variations at the die surface are substantially reduced. A foam enclosure 401 surrounds the test fixture 303 on all sides except for a conventional thermally insulating work surface 403 and a viewing port 405. The thermal foam is supported by a plastic box 407 and an additional layer of foam 409 is placed on the top surface surrounding the viewing port 405 in order that to limit heat flow around the viewing port 405. Within the viewing port 405 there is a viewing window and convection barrier 411 which is comprised of glass. To further control the thermal variations at the semiconductor die 317 surface, a transparent convection barrier 413 is placed over the area opening onto the semiconductor die 317. This transparent convection barrier 413 is also made of glass. Foam thermal barriers 401 and 409 are constructed from urethane in the preferred embodiment. Connection to thermal sensor 319 is coupled through the foam thermal barriers 401 and plastic box 407 by clearance openings to the control network 321 and temperature set 323.

Figure 5:
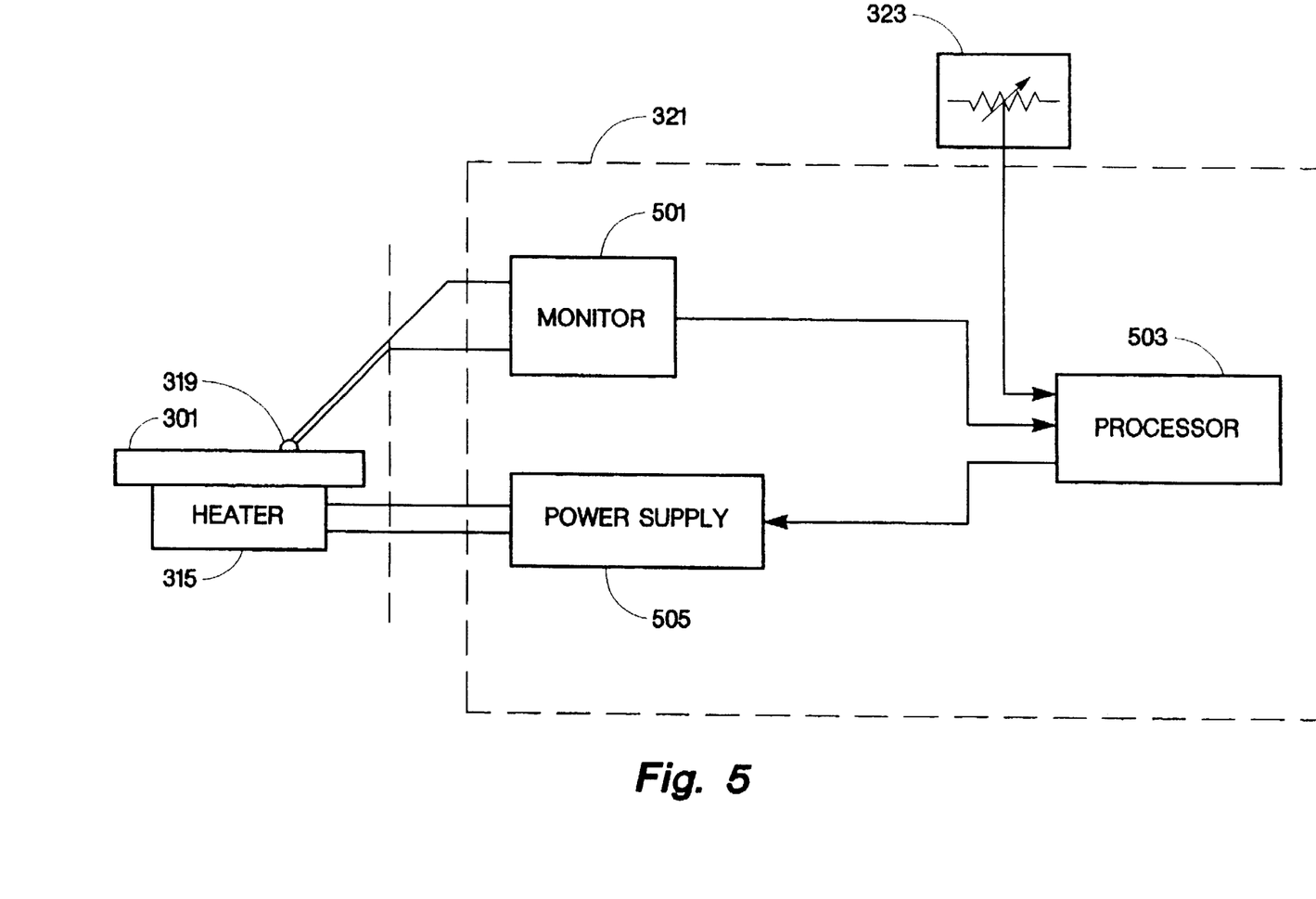
FIG. 5 is a schematic diagram of a control network which may be employed in the present invention.

Active control of the temperature of the integrated circuit is achieved as shown in the schematic diagram of FIG. 5. Output from the thermal sensor 319 is input to a sensor monitor 501, which in the preferred embodiment, is an HP3478 DVM operating in 4-wire ohms measurement mode. Monitor 501 is coupled to a processor 503 which in the preferred embodiment consists of a microcomputer such as an HP71B or IBM PC, associated memory, software, and interface boards. This processor takes the input from monitor 501 and a temperature set value from temperature set 323 and performs the steps shown in FIG. 8 and outputs a control to a heater power supply 505. The power supply 505 supplies an electric current to the Peltier device junction heater 315 corresponding to the amount of heat to be applied to the semiconductor 301. In the preferred embodiment, the temperature set 323 is a value provided to the microcomputer by keyboard entry.

As described previously, excessive heat dissipation from the semiconductor die results in hotspots appearing on the die wherever the heat dissipation occurs. These hotspots can be observable with the application of the thermally sensitive liquid crystal material. Typically, this liquid crystal material is applied to the surface of a semiconductor die without significant control of the thickness of the liquid crystal material. The thickness of a liquid crystal material applied in conventional manner ranges from 25 to 50 microns and becomes especially thick around bondwires where the material wicks to a greater thickness around the bondwire. When practicing the present invention, a significantly thinner layer of liquid crystal material is deposited upon the semiconductor die. This thickness typically ranges from 10 to 5 microns. It is a feature of the present invention that the surface of the semiconductor die is wet with an organic pretreatment material that encourages the liquid crystal material to spread more consistently and more thoroughly across the surface of the semiconductor die. The wetting material of the preferred embodiment also tends to cause a majority of the long-chain molecules of the liquid crystal to more favorably lie parallel to the surface of the semiconductor die. In the preferred embodiment, a polyvinyl alcohol (PVA) in an aqueous solution (of a concentration of 1.3 g/l) is deposited upon the surface of the die by micropipette or syringe. This is accomplished by manual methods. The water is subsequently evaporated by heated or air drying, thereby leaving the PVA material on the die surface.

Figure 6:
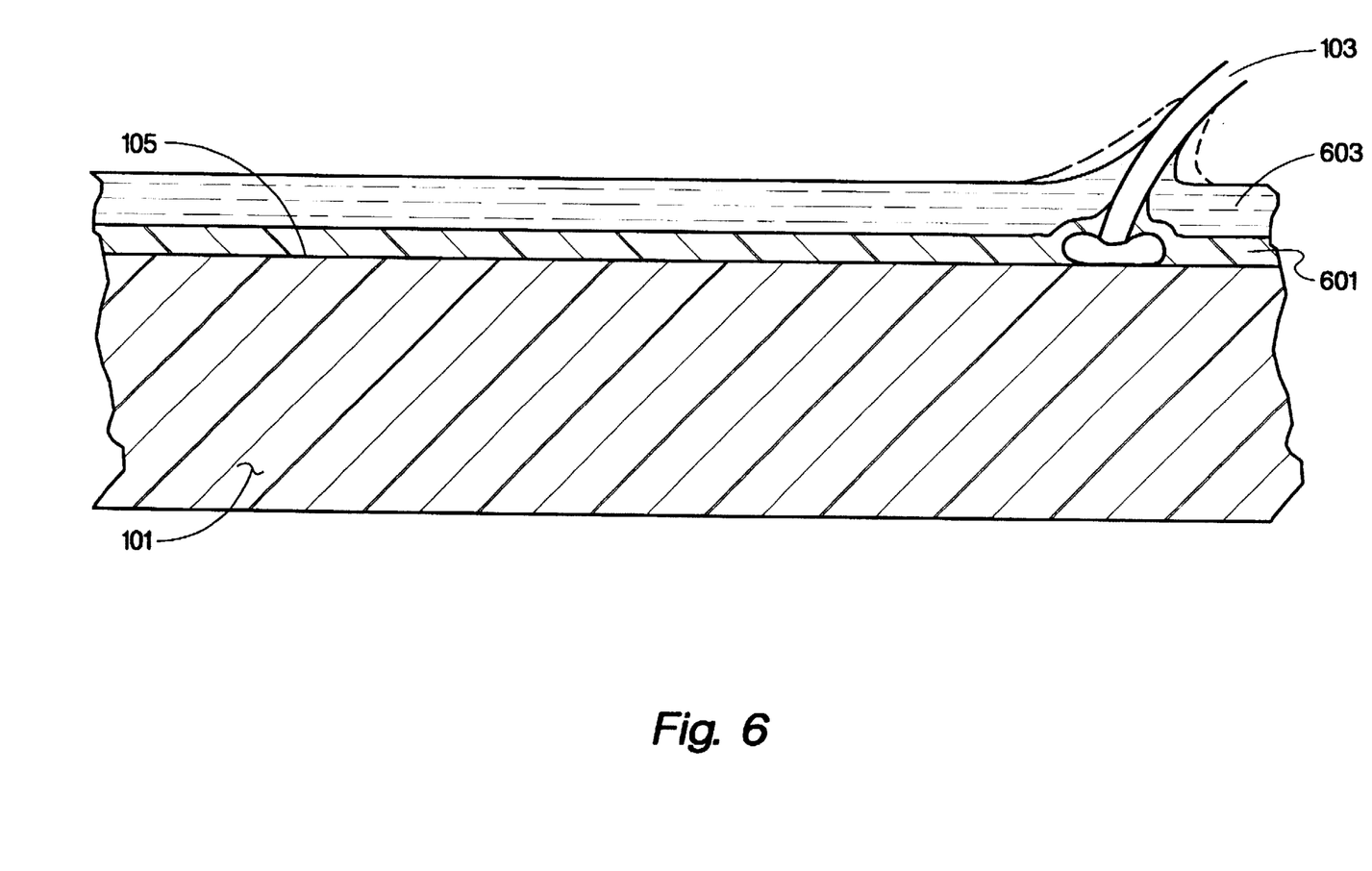
FIG. 6 is a magnified cross sectional representation of a semiconductor device upon which a liquid crystal material has been deposited consistent with the teachings of the preferred embodiment of the present invention.

As shown in the semiconductor cross section of FIG. 6, the PVA layer 601 is deposited and dried in a thin layer upon the die surface 105. The liquid crystal material can be selected from several types of materials such as those disclosed in U.S. Pat. No. 4,682,857 or by C. E. Stephens et al., "A Surface Temperature Limit Detector Using Nematic Liquid Crystals with an Application to Microcircuits", Journal of Physics E: Scientific Instruments, Vol. 7, 1974, pp. 641–643. The temperature range of the particular liquid crystal selected should match the temperature at which the semiconductor and heater is expected to operate. In the preferred embodiment, the liquid crystal material is deposited by micropipette upon the PVA surface 601 as layer 603. The PVA cooperates with the liquid crystal material to reduce the thickness and improve the uniformity of the resulting liquid crystal film by promoting even wetting of the liquid crystal and preventing dewetting over time. This uniformity of liquid crystal layer provides an improvement in thermal sensitivity of approximately 25% over the previous thicker layer. One significant improvement realized with the surface wetting prior to the application of liquid crystal material and the careful control of thermal variations is the production of a thermally uniform sensitive layer across virtually the entire surface of the semiconductor die thereby avoiding banding of useful thermal sensitivity in one band across the semiconductor die.

Figure 7:
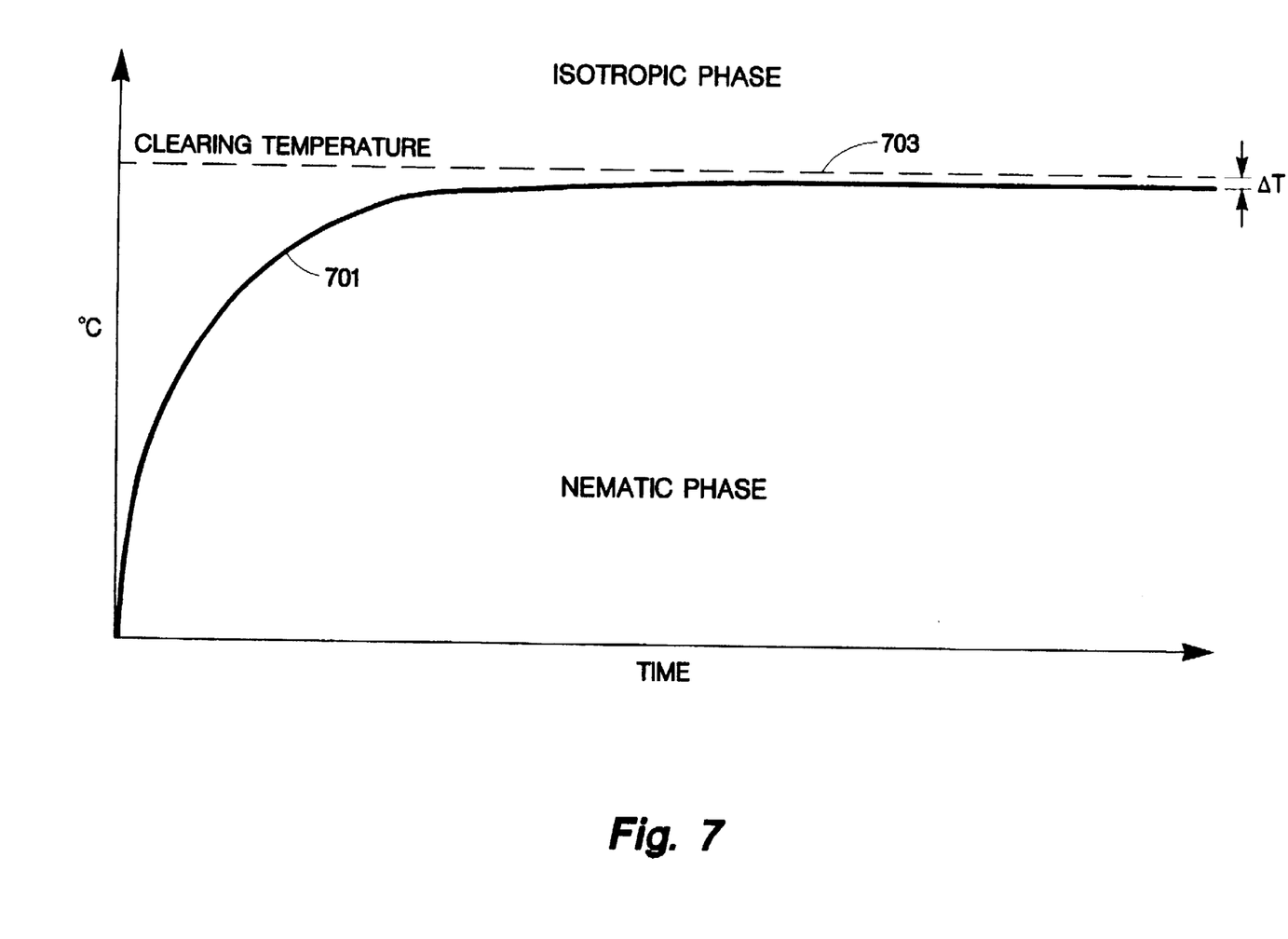
FIG. 7 is a graph of the temperature of the liquid crystal material versus time consistent with the teachings of the preferred embodiment of the present invention.

A temperature versus time curve illustrating the time during which the liquid crystal material is sensitive and useful for viewing of hotspots is shown in FIG. 7. As the temperature of the liquid crystal material, represented as curve 701, approaches the clearing temperature, illustrated as 703, the liquid crystal material reaches its most sensitive viewing characteristic. In the preferred embodiment, the temperature of the liquid crystal film is held to a $\Delta T$ temperature range of 0.001 to 0.024 degrees Celcius with an average of 0.007 degrees Celcius or less.

Figure 8:
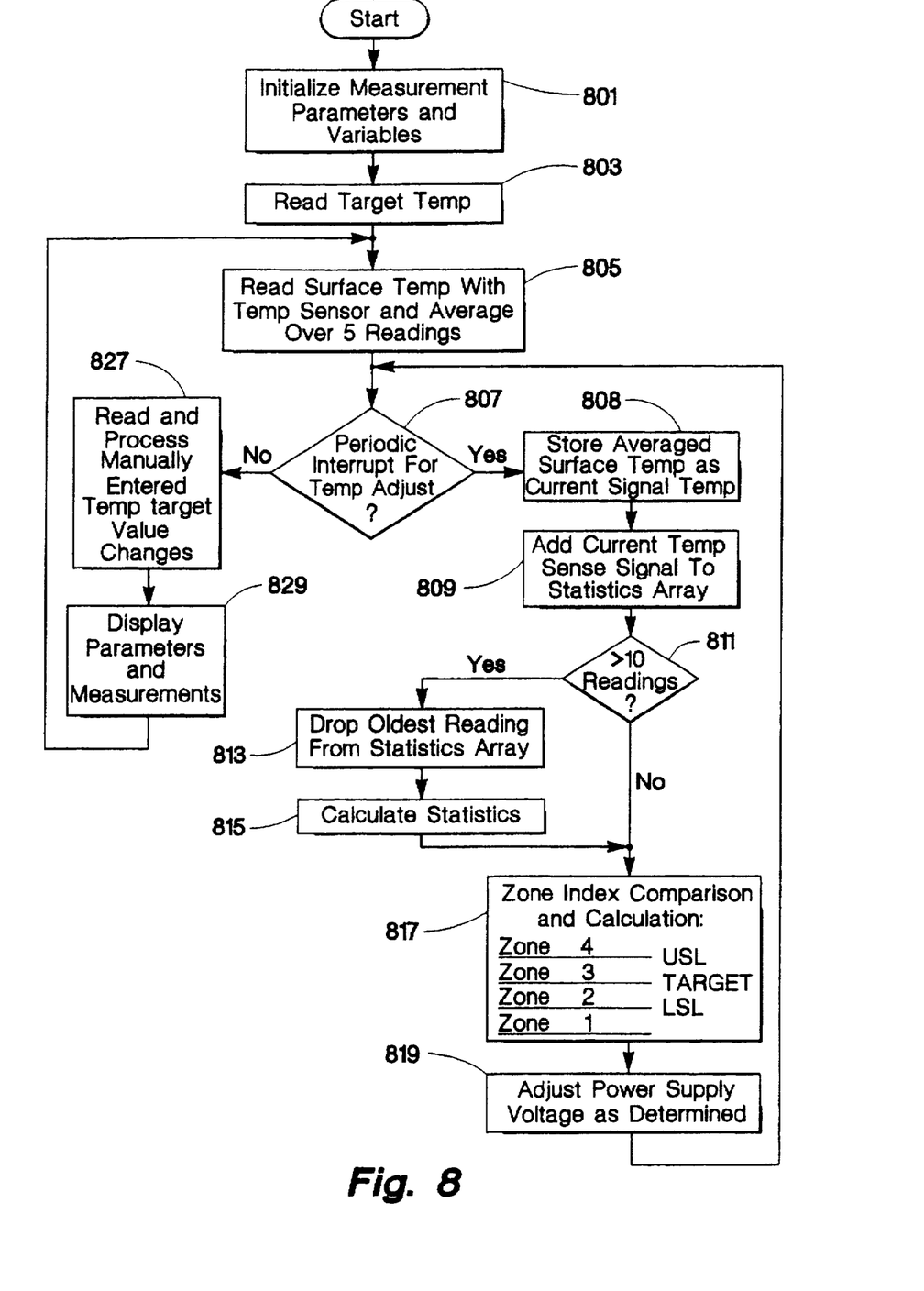
FIG. 8 is a flowchart of the process employed in the preferred embodiment of the present invention to control the temperature of the semiconductor die under test.

A flowchart of the process of temperature control utilized by the processor 503 is shown in FIG. 8. The measurement parameters and storage variables are initialized at 801, the commencement of the temperature control process. The commencement target temperatures are read into the process at 803 and a sequence of nominal temperature measurements at or near the surface of the semiconductor die 317 from the temperature sensor are read and averaged at 805. In the preferred embodiment, a temperature reading is made every one second and a rolling average temperature is maintained over the most recent five temperature readings. Additional temperature sensors may be accommodated in the process by sequentially reading, averaging, and separately storing the results. Periodically, in the preferred embodiment every 24 seconds, the process determines that a temperature adjustment is to be considered, at 807. The most recent five temperature reading average is stored in a unique memory location as the current temperature, at 808. The previously stored average temperature from the last periodic temperature adjust interrupt is deemed the previous temperature. The current temperature is then stored into the statistics array, at 809, and if the number of current temperature statistics exceeds 10, at 811, the statistics corresponding to the earliest current temperature are dropped from the statistics array, at 813. Statistical values (in temperature mean, standard deviation, and Cpk) for the temperature statistical array are recalculated with the newest current temperature value being included, at 815.

A zone index calculation is performed in the step of 817. This zone index calculation may be better understood by referring to FIG. 9. Over a sampling period of time (which is the preferred embodiment is 24 seconds), the previous and current temperatures, which are measured by the thermal sensor 319, are recorded as described above. The value and trajectory of the temperature is categorized into 22 categories as indicated by 901–922 of FIG. 9.

Figure 9:
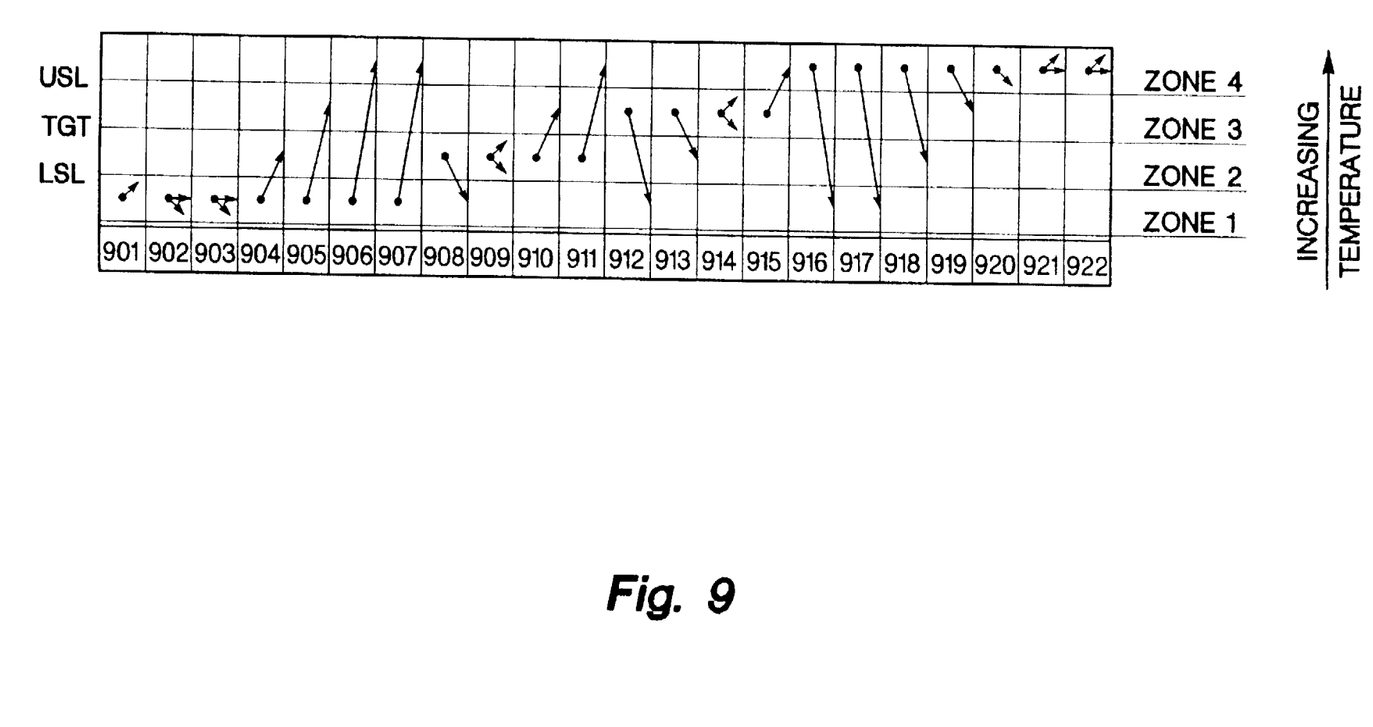
FIG. 9 is a temperature value and trajectory diagram useful in the process of FIG. 8.

In addition to holding the voltage output from the power supply 505 constant (to maintain the temperature of the heater element 315), three possible actions in either a positive voltage or a negative voltage change of output voltage may be taken by the power supply 505 in response to the temperature value and trajectory category determination. These three actions, in the preferred embodiment, are to: (a) step the power supply voltage (up or down), (b) pulse the power supply voltage (up or down), or (c) bifurcate the power supply voltage (up or down). A step change in power supply voltage is the smallest resolvable incremental change available to the voltage, which in the preferred embodiment is a ±5 mV increment, and is a change made for at least the duration of a sampling period. A pulse change in the power supply voltage is a change of power supply voltage in a positive or negative direction for a portion of the sampling period time proportional to the fractional distance the current temperature is from the nearest specification limit to the target (TGT) temperature (which is manually read in step 827). For example, if the current temperature were mid-way between the target (TGT) temperature and the lower specification level (LSL), a positive pulse of the incremental power supply voltage applied for 50% of the sampling period time would be output from the power supply 505. The power supply voltage would then return to its previously established voltage for the remaining 50% of the sampling time period. As another example, if the current temperature were three-quarters the distance to the upper specification limit (USL) from the target (TGT) temperature, a negative pulse of the incremental power supply voltage applied for 75% of the sampling period time would be output before returning to the previous voltage for the remainder of the period. A bifurcation of the power supply voltage is a coarser adjustment in which a range of the power supply is established with one range limit at the current power supply voltage and the other range limit at a voltage selected to encompass the expected operating range of the heater element 315. The voltage output from the power supply after bifurcation will be greater than or less than the current power supply voltage, as the case may be. In the preferred embodiment the range limit voltage is selected to be 0.64 Volts. A power supply voltage is set at a voltage mid-way between the upper and lower range limit. As the bifurcation process continues, the range is reduced by one-half the voltage range for each iteration of the process, either by increasing the lower range limit or by decreasing the upper range limit. This bifurcation process may continue until the upper and lower range limits are approximately the incremented change value of the power supply (the range limits are then deemed "closed").

Returning to FIG. 9, the current temperature and trajectory are calculated by processor 503 and placed into one of the categories 901–922 where the dot at the arrow tail indicates the previous temperature and the arrow point indicates the current temperature. An action is then selected for the output voltage of the power supply 505 in accordance with Table 1 resulting in the power supply (PS) output voltage being adjusted, at 819.

TABLE 1

| CATEGORY | ACTION |
| --- | --- |
| 901 | Hold PS Value |
| 902 | Bifurcate PS Value Up if Range Limits Not Closed |
| 903 | Step PS Value Up if Range Limits Closed |
| 904 | Hold PS Value |
| 905 | Pulse PS Value Down |
| 906 | Bifurcate PS Value Down if Range Limits Not Closed |
| 907 | Step PS Value Down if Range Limits Closed |
| 908 | Step PS Value Up |
| 909 | Pulse PS Value Up |
| 910 | Pulse PS Value Down |
| 911 | Step PS Value Down |
| 912 | Step PS Value Up |
| 913 | Pulse PS Value Up |
| 914 | Pulse PS Value Down |
| 915 | Step PS Value Down |
| 916 | Bifurcate PS Value Up if Range Limits Not Closed. |
| 917 | Step PS Value Up if Range Limits Closed |
| 918 | Pulse PS Value Up |
| 919 | Hold PS Value |
| 920 | Hold PS Value |
| 921 | Bifurcate PS Down if Range Limits Not Closed |
| 922 | Step PS Down if Range Limits Closed |

The process then returns to the test for periodic interrupt, at 807 of FIG. 8. When a temperature adjustment is not being made, the process monitors for manually input changes to the temperature target value and, upon the entry of a new target value, the new value is processed into the temperature control, as indicated at 827. Current parameters and measurements are displayed, at 829, before returning to the process.

What is claimed is:

1. A method of measuring temperature variations of a material surface comprising the steps of:

depositing a layer of organic pretreatment on the material surface;

depositing a layer of thermographically sensitive liquid crystal on said organic pretreatment layer whereby a controlled layer thickness is achieved and temperature variations detected;

controlling the nominal temperature of the material surface to he measured, including sensing the nominal temperature near the material surface with a temperature sensing element disposed in thermal communication with the material surface, converting said sensed temperature to a current temperature sense signal, comparing said current temperature sense signal to a target temperature value, and activating a heater in thermal communication with said material surface when said current temperature sense signal varies from said target temperature value; and thermally insulating the material surface and a volume of gas adjacent the material surface.

2. A method in accordance with the method of claim 1 wherein said converting said sensed temperature further comprises the step of averaging said sensed temperature over time.

3. A method in accordance with the method of claim 2 wherein said step of comparing said current temperature sense signal to a target temperature value further comprises the steps of:

determining a period of time over which an adjustment of temperature of said heater will be calculated;

determining the trajectory of said current temperature sense signal during said determined period of time; and categorizing said current temperature sense signal and said trajectory into one of at least three categories of heater responses.

4. A method of measuring temperature variations of a material surface comprising the steps of:

depositing a layer of organic pretreatment on the material surface;

depositing a layer of thernographically sensitive liquid crystal on said organic pretreatment layer whereby a controlled layer thickness is achieved and temperature variations detected;

controlling the nominal temperature of the material surface to be measured, including sensing the nominal temperature near the material surface, converting said sensed temperature to a current temperature sense signal, averaging said sensed temperature over time, comparing said current temperature sense signal to a target temperature value by determining a period of time over which an adjustment of temperature of said heater will be calculated, determining the trajectory of said current temperature sense signal during said determined period of time, and categorizing said current temperature sense signal and said trajectory into one of at least three categories of heater responses;

activating a heater in thermal communication with said material surface when said current temperature sense signal varies from said target temperature value by adjusting energy supplied said heater in an incremental step value over a period of time equal in duration to said predetermined period of time when said current temperature sense and trajectory are categorized into a first category of said at least three categories of heater responses, adjusting energy supplied said heater with a pulsed change over a period of time less than the duration of said predetermined period of time when said current temperature sense and trajectory are categorized into a second category of said at least three categories of heater responses, and adjusting energy supplied said heater with a bifurcated adjustment value equal in value to the sum of a current heater activation value and a value equal to the difference between said current heater activation value and a predetermined value; and thermally insulating the material surface and a volume of gas adjacent the material surface.

5. A method in accordance with the method of claim 1 wherein said step of depositing a layer of organic pretreatment further comprises the step of depositing a layer of polyvinyl alcohol on the material surface.

6. A microthermographic measurement apparatus for a material surface comprising:

a layer of organic pretreatment deposited on the material surface;

a layer of thermographically sensitive liquid crystal material deposited on said organic pretreatment layer in a controlled layer thickness whereby temperature variations are detected;

a temperature sensing element disposed in thermal communication with the material surface for generating a temperature sense signal;

a comparator which compares said temperature sense signal to a target temperature value;

a heater disposed in thermal communication with the material surface and activated when said comparator indicates said temperature sense signal varies from said target temperature value, and a thermal insulator encompassing the material surface and an adjacent volume of gas.

7. A microthermographic measurement apparatus in accordance with claim 6 wherein said layer of organic pretreatment further comprises polyvinyl alcohol.

8. A microthermographic measurement apparatus in accordance with claim 6 wherein said comparator further comprises a processor which determines a period of time over which an adjustment of temperature of heater will be calculated from the magnitude and trajectory of said temperature sense signal during said period of time.

9. A microthermographic measurement apparatus in accordance with claim 8 further comprising an electric power supply coupled to said heater and receiving heater control signal from said processor.

10. A microthermographic measurement apparatus for a material surface comprising:

a layer of organic pretreatment deposited on the material surface;

a layer of thermographically sensitive liquid crystal material deposited on said organic pretreatment layer in a controlled layer thickness whereby temperature variations are detected;

a temperature-sensing element disposed in thermal communication with the material surface for generating a temperature sense signal;

a comparator which compares said temperature sense signal to a target temperature value and includes a processor which determines a period of time over which an adjustment of temperature of a heater will be calculated from the magnitude and trajectory of said temperature sense signal during said period of time;

said heater disposed in thermal communication with the material surface and activated when said comparator indicates said temperature sense signal varies from said target temperature value;

an electric power supply coupled to said heater and receiving a heater control signal from said processor;

a first adjustment mode which supplies a change in voltage to said heater as an incremental step value over a period of time equal in duration to said predetermined period of time when said trajectory of said temperature sense signal will place the temperature sense signal greater than a predetermined magnitude apart from said target temperature value;

a second adjustment mode which supplies a change in voltage to said heater as a pulse over a period of time less than the duration of said predetermined period of time when said trajectory of said temperature sense signal will place the temperature sense signal less than said predetermined magnitude apart from said target temperature value but said trajectory is in a direction which will move said temperature sense signal away from said target temperature value;

third adjustment mode which supplies a bifurcated change in voltage to said heater equal in value to the sum of voltage currently supplied to the heater and the voltage equal to the difference between the voltage currently supplied to the heater and a predetermined voltage when said magnitude and trajectory of said temperature sense signal is greater than said predetermined magnitude apart from said target temperature value and will place the temperature sense signal greater than said predetermined magnitude apart from said target temperature value; and a thermal insulator encompassing the material surface and an adjacent volume of gas.

* * * * *